US008856859B2

(12) United States Patent
Kirkup et al.

(10) Patent No.: US 8,856,859 B2
(45) Date of Patent: Oct. 7, 2014

(54) SYSTEM AND METHOD FOR SETTING APPLICATION PERMISSIONS

(75) Inventors: Michael Kirkup, Waterloo (CA); Tariq Tahir, Waterloo (CA); Michael K. Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1337 days.

(21) Appl. No.: 11/671,706

(22) Filed: Feb. 6, 2007

(65) Prior Publication Data
US 2008/0189793 A1 Aug. 7, 2008

(51) Int. Cl.
G06F 12/14 (2006.01)
G06F 21/60 (2013.01)
G06F 21/62 (2013.01)
H04L 29/06 (2006.01)
G06F 21/53 (2013.01)

(52) U.S. Cl.
CPC .......... *G06F 21/6218* (2013.01); *G06F 21/604* (2013.01); *H04L 63/102* (2013.01); *G06F 21/53* (2013.01)
USPC ....................... 726/1; 726/4; 726/21; 713/152

(58) Field of Classification Search
None
See application file for complete search history.

(56) References Cited

U.S. PATENT DOCUMENTS

| | | | | |
|---|---|---|---|---|
| 6,963,968 | B2 * | 11/2005 | Kori ................................... | 713/1 |
| 2004/0148514 | A1 | 7/2004 | Fee et al. | |
| 2004/0177270 | A1 * | 9/2004 | Little et al. ..................... | 713/200 |
| 2008/0009325 | A1 * | 1/2008 | Zinn et al. ..................... | 455/566 |

FOREIGN PATENT DOCUMENTS

| | | |
|---|---|---|
| CA | 2619300 | 8/2008 |
| EP | 1956509 | 8/2008 |
| EP | 2073138 | 6/2009 |
| WO | 2005/076105 A | 8/2005 |

OTHER PUBLICATIONS

Office Action dated Apr. 6, 2011 for the corresponding Canadian patent application No. 2,619,300.
Extended European Search Report. European Patent Application No. 07101797.4. Dated: Apr. 11, 2007.
Response. European Patent Application No. 07101797.4. Dated: Aug. 29, 2007.
Exam Report. European Patent Application No. 07101797.4. Dated: Nov. 21, 2007.
Response. European Patent Application No. 07101797.4. Dated: Mar. 12, 2008.
Summons to attend oral proceedings pursuant to Rule 115(1) EPC. European Patent Application No. 07101797.4. Dated: Jun. 26, 2008.

(Continued)

*Primary Examiner* — Kaveh Abrishamkar
(74) *Attorney, Agent, or Firm* — Bereskin & Parr LLP/S.E.N.C.R.L., s.r.l.

(57) ABSTRACT

There is disclosed a system and method for setting application permissions. In an embodiment, the method comprises reviewing the current application permissions settings on the device; comparing the current application permissions settings to a set of required application permissions settings for the software application; listing the set of required application permissions; and providing means to grant permission for all required application permissions the user is authorized to grant. In another embodiment, only the required application permissions requiring a grant of permission and which the user is authorized to grant are listed. The user may be provided with means to grant permission for all required permissions the user is authorized to grant in a single response.

21 Claims, 5 Drawing Sheets

(56) References Cited

OTHER PUBLICATIONS

Response. European Patent Application No. 07101797.4. Dated: Oct. 30, 2008.
Provision of the minutes in accordance with Rule 124(4) EPC. European Patent Application No. 07101797.4. Dated: Dec. 22, 2008.
Decision to refuse a European Patent application. European Patent Application No. 07101797.4. Dated: Dec. 22, 2008.
Extended European Search Report. European Patent Application No. 08170319.1. Dated: May 19, 2009.
Response. European Patent Application No. 08170319.1. Dated: Aug. 14, 2009.
Exam Report. European Patent Application No. 08170319.1. Dated: Nov. 11, 2009.
Response. European Patent Application No. 08170319.1. Dated: Mar. 15, 2010.
Exam Report. European Patent Application No. 08170319.1. Dated: Nov. 8, 2010.
Response. European Patent Application No. 08170319.1. Dated: May 18, 2011.
Exam Report. European Patent Application No. 08170319.1. Dated: Sep. 12, 2011.
Response. European Patent Application No. 08170319.1. Dated: Jan. 12, 2012.
Summons to attend oral proceedings pursuant to Rule 115(1) EPC. European Patent Application No. 08170319.1. Dated: Nov. 5, 2012.
Response. European Patent Application No. 08170319.1. Dated: Mar. 18, 2013.
Decision to refuse a European Patent application. European Patent Application No. 08170319.1. Dated: May 13, 2013.
Notice of Allowance. Canadian Patent Application No. 2,619,300. Dated: Apr. 13, 2012.

\* cited by examiner

SYSTEM AND METHOD FOR SETTING APPLICATION PERMISSIONS

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to systems and methods for setting application permissions.

BACKGROUND

Handheld mobile communication devices are becoming more versatile. In addition to an operating system (OS) and a basic set of software applications, many handheld devices are now capable of running a large number of third party software applications including business productivity software, custom software applications for specific industries, gaming software, and the like. As the number of available software applications increases, the process for setting up the software applications may also become more complex.

Ideally, a process for setting up a new software application on a handheld device may be fully automated. However, in practice, there may be a need to prompt the user to grant certain permissions (e.g. to change a setting or to provide access to user data). This may especially be required where the software application setup may require changes to device settings that may affect operation of other software applications already installed and running on the device, or that may incur a charge by activating a device feature. In enterprise environments, in which a large number of the handheld devices may be centrally maintained by an administrator, there may also be enterprise security policies requiring administrative control over certain device settings.

For users, numerous prompts to provide inputs or permissions when setting up a new application may be confusing. If the user cannot understand why a permission is required, the user may be inclined to deny some or all of the requested permissions. These denials of permission may have an unintended effect of causing the setup and operation of the software application to fail, or otherwise may limit the functionality of the software application on the handheld device. Alternatively, the user may grant a blanket permission to all requests without thinking, and may inadvertently activate features, or change settings that the user did not intend to change.

Thus, what is needed is a system and method for setting application permissions that may address one or more of the limitations as described above.

DETAILED DESCRIPTION

As noted above, the present invention relates to a system and method for setting application permissions.

Figure 1:
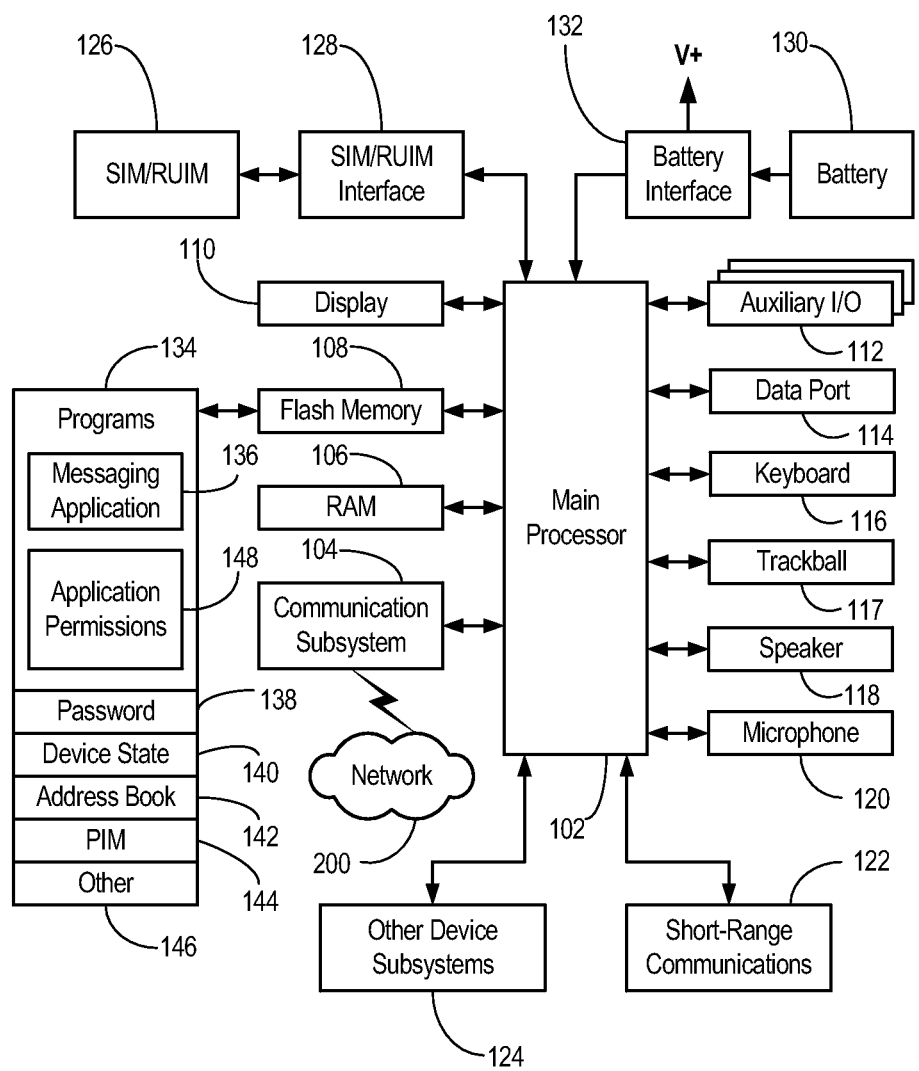
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and sends messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122 and other device subsystems 124 (such as a GPS subsystem).

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100.

The main processor 102, in addition to its operating system functions, enables execution of software applications 134 on the communication device 100. The subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the device 100 such as in a data store of an associated host system that the communication device 100 communicates with.

Another program that may be executed by the communication device 100 is a password approval module 138 that may provide approval for user passwords. The password approval module 138 may execute a password approval method to determine whether the user password specified by the user of the communication device 100 is approved.

The communication device 100 may further include a device state module 140, an address book 142, a Personal Information Manager (PIM) 144, and various other modules 146. Additional software applications may also be loaded onto the communication device 100 through at least one of the wireless network 200, the auxiliary I/O subsystem 112, the data port 114, the short-range communications subsystem 122, or other device subsystem 124.

The communication device 100 may also include an application permissions module 148 for handling various application permissions for the various software applications 136, 138, 140, 142, 144, 146 running on device 100. Application permissions module 148 may be configured to control various application permissions that each software application may access. For example, application permissions module 148 may control access to address book 142 functions for certain third party software applications, due to privacy or security concerns. For each software application, application permissions module 148 may identify (e.g. receive from each software application) a set of application permissions required for that software application. A more detailed description of application permissions module 148 will follow further below.

Figure 2:
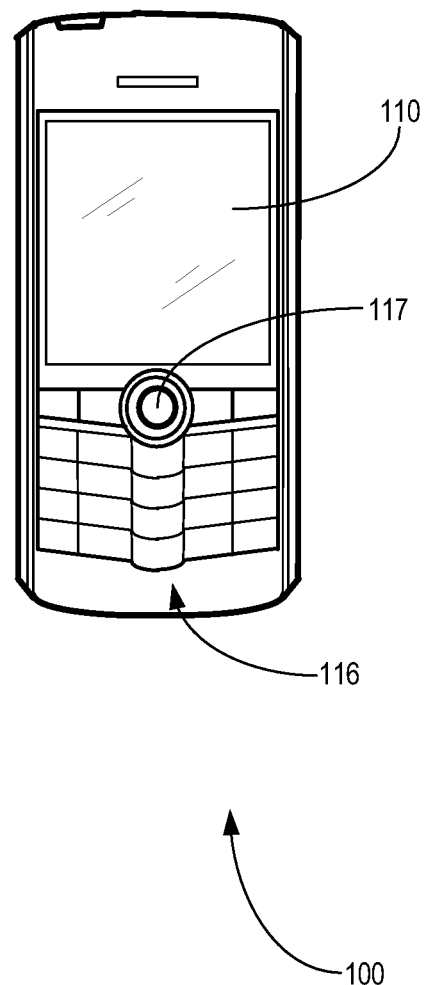
FIG. 2 is an illustrative example of a handheld mobile communication device that may provide an operating environment.

Now referring to FIG. 2, shown is an illustrative front view of a handheld mobile communication device 100 that may provide a suitable operating environment. As shown, the device 100 may include a display 110, a keyboard 116, and other input or navigation means such as a trackball 117. The display 110 may be configured to display various screens allowing the user of device 100 to view screen outputs from application permissions module 148, and to provide an input in response to a prompt or query displayed on display 110.

In an embodiment, application permissions module 148 may be configured to identify requirements for application permissions for setting up a new software application on device 100, as determined by an application developer. Suppose, for example, that the software application being setup needs to access system resources that are currently denied by the application permissions settings. Rather then risk having the software application fail to operate properly, it is proposed that the user be given the option of granting permission to access all required permissions at the time of setup (e.g. during installation or initial operation of the software application), as determined by the application developer. If the user wishes to grant the permissions at the time of setup, and the user is authorized to do so, then the likelihood of proper operation of the software application may be significantly improved.

Now referring to FIGS. 3A to 3D, shown are illustrative screens that may be displayed by application permissions module 148 on display 110 for setting application permissions for an illustrative "XYZ" software application to be run on device 100 of FIG. 1 and FIG. 2.

Figure 3A:
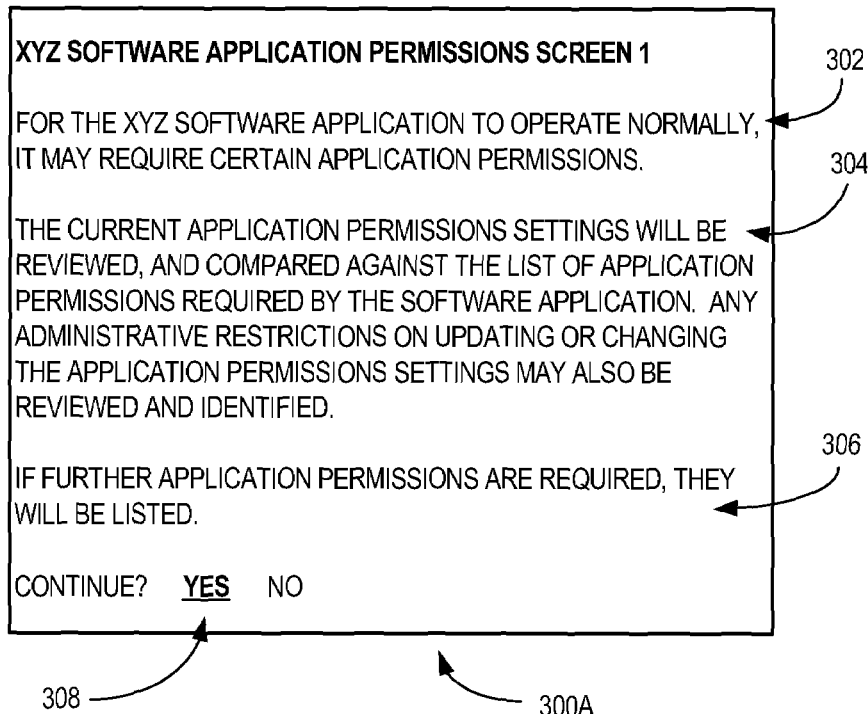
FIGS. 3A to 3D are illustrative screens for setting up software applications on the handheld mobile communication device of FIG. 2.

By way of illustration, FIG. 3A shows illustrative screen 300A entitled XYZ SOFTWARE APPLICATION PERMISSIONS SCREEN 1, and provides at 302 an explanation to the user of device 100 that permissions are required to run the software, as follows: "FOR THE XYZ SOFTWARE APPLICATION TO OPERATE NORMALLY, IT MAY REQUIRE CERTAIN APPLICATION PERMISSIONS".

Illustrative screen 300A may then explain to the user at 304 that, during setup, the current application permission settings of device 100 will be reviewed and compared against the list of application permissions required (e.g. as determined by the application developer and stored in application permissions module 148). This may include reviewing and identifying any administrative restrictions on updating or changing the application permissions settings as may be specified by a system administrator.

An illustrative example of application permissions and their default settings on device 100 is provided in Table A, below.

TABLE A

| Application Permissions | Description | Default setting |
| --- | --- | --- |
| Internal Domains | Specify the internal domain names to which the application can establish a connection. | Null value (not set) |
| External Domains | Specify the external domain names to which the application can establish a connection. | Null value (not set) |
| Browser Filter Domains | Specify the domains for which the application can apply browser filters to web page content on the Device. For example, you can specify google.com and yahoo.com as domains for which you allow an application to use a search engine browser filter on the Device. | Null value (not set) |
| Interprocess Communication | Specify whether or not the application can perform interprocess communication operations. You can use this application control policy rule to prevent two or more applications from sharing data and to prevent one application from using the connection permissions of another application. | Allowed |
| Internal Network Connections | Specify whether or not the application can make internal corporate network connections. You can use this application control policy rule to allow or prevent the application from sending or receiving any data on the Device using an | Prompt User |

TABLE A-continued

| Application Permissions | Description | Default setting |
|---|---|---|
| | internal protocol (for example, using the connection service) or to require that the user respond to a prompt on the Device to allow internal connections through the Device firewall. | |
| External Network Connections | Specify whether or not the application can make external network connections. You can use this application control policy rule to allow or prevent the application from sending or receiving any data on the Device using an external protocol (for example, using a WAP gateway, public MDS Services, or TCP), or to require that the user respond to a prompt on their Device to allow external connections through the Device firewall. | Prompt User |
| Local Connections | Specify whether or not the application can make local network connections (for example, connections to the Device using a USB or serial port). | Allowed |
| Phone Access | Specify whether or not the application can make phone calls and access phone logs on the Device. You can use this application control policy rule to allow or prevent the application from making any calls on the Device or to require that the user respond to a prompt on the Device to allow the application to make a phone call. | Prompt User |
| Message Access | Specify whether or not the application can send and receive messages on the Device using the email API. | Allowed |
| PIM Data Access | Specify whether or not the application can access the Device PIM APIs, which control access to the user's personal information on the Device, including the address book.<br>Note: Allowing the application to access PIM data APIs and use internal and external network connection protocols creates an opportunity for an application to send all of the user's personal data from their Device. | Allowed |
| Browser Filters | Specify whether or not the application can access browser filter APIs to register a browser filter with the browser on the Device. You can use this application control policy rule to allow third-party applications to apply custom browser filter to web page content on the Device. | Not Permitted |
| Event Injection | Specify whether or not the application can inject synthetic input events, such as pressing keys and performing trackwheel actions, on the Device. | Not Permitted |
| Bluetooth Serial Profile | Specify whether or not the application can access the Bluetooth ® Serial Port Profile (SPP) API.<br>Note: If you set the Disable Serial Port Profile IT policy rule to True, the Bluetooth enabled Device cannot use the Bluetooth SPP to establish a serial connection to a Bluetooth enabled device. | Allowed |
| Device Keystore | Specify whether or not the application can access the Device key store APIs.<br>If you set the Minimal Signing Key Store Security Level and the Minimal Encryption Key Store Security Level IT policy rules to high, the Device prompts the user for the Device key store password each time an application tries to access the user's private key on the Device, and the Device does not use this application policy control rule. | Allowed |
| Device Keystore Medium Security | Specify whether or not the application can access key store items at the medium security level (the default level), which requires that the Device prompt the user for the Device key store password when an application tries to access the user's private key for the first time or when the private key password timeout expires.<br>If you set the Minimal Signing Key Store Security Level and the Minimal Encryption Key Store Security Level IT policy rules to high, the Device prompts the user for the Device key store password each time an application tries to access their private key, and this application policy control rule is not recognized. | Allowed |
| Device GPS | Specify whether or not the application can access the Device Global Positioning System (GPS) APIs. You can use this application control policy rule to allow or prevent the application from accessing the GPS APIs on the Device or to require that the user respond to a prompt on the Device to allow access to the GPS APIs. | Prompt User |
| Theme Data | Specify whether or not the Device can use the custom theme applications, which developers can create using the Plazmic CDK, as themes if they exist on the Device. | Allowed |

TABLE A-continued

| Application Permissions | Description | Default setting |
| --- | --- | --- |
| User Authenticator API | Specify whether or not the Device allows an application to access the user authenticator framework API. The user authenticator framework allows the registration of drivers (currently smart card drivers only) that provide two-factor authentication to unlock the Device. This application control policy rule applies to the Device Software and third-party Java applications. | Allowed |

Still referring to FIG. 3A, illustrative screen 300A may further explain to the user at 306 that, if further application permissions are required, they will be listed. Illustrative screen 300A may then ask the user at 308 whether or not to continue.

Figure 3B:
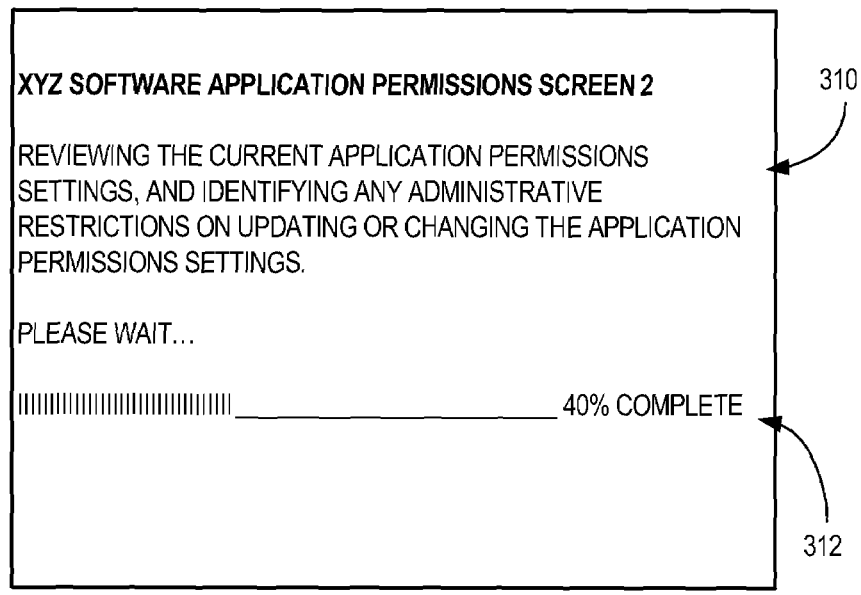

Referring now to screen 300B of FIG. 3B, if the user has chosen to continue with the setup, application permissions module 148 may review the current application permissions settings, and identify any administrative restrictions on updating or changing the application permissions settings as may be specified by a system administrator.

Figure 3C:
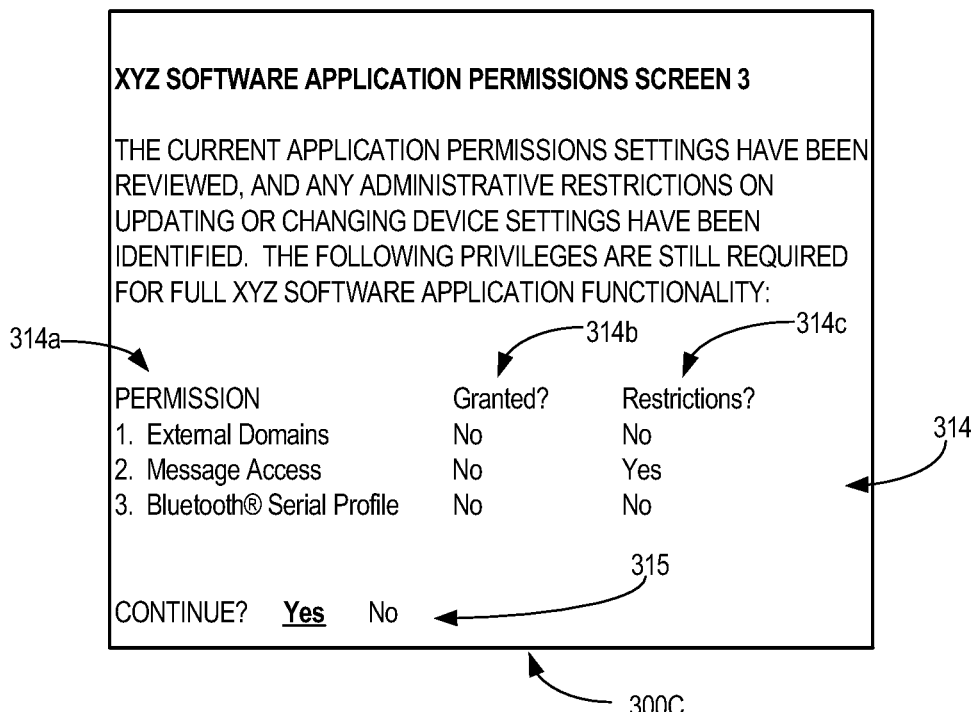

As shown in screen 300C of FIG. 3C, upon reviewing the current application permissions settings, and any administrative restrictions, application permissions module 148 may be configured to identify and provide the user of device 100 with a list 314 of all permissions required for proper operation of the XYZ software application. If the application permissions module 148 has detected that certain application permissions settings are already granted, then further permission is not required. In this case, the permissions already granted may be indicated.

Still referring to FIG. 3C, as an illustrative example, XYZ software application may require three application permissions 314a, namely: 1) External Domains; 2) Message Access; and 3) Bluetooth® Serial Profile capabilities. By listing all of the required permissions, as illustrated in list 314, the user is notified of the permissions that will be required for proper operation of the XYZ software application. As shown in FIG. 3C, the user may also be shown which of the required application permissions have already been granted (e.g. using a permission grant status column 314b). In this illustrative example, none of the required permissions are shown to be already granted. A second restriction status column 314b may also indicate whether there are any administrative restrictions on changing the application permission setting. In this illustrative example, the Message Access application permission is shown as having an administrative restriction. The user may then be prompted at 315 to continue.

Figure 3D:
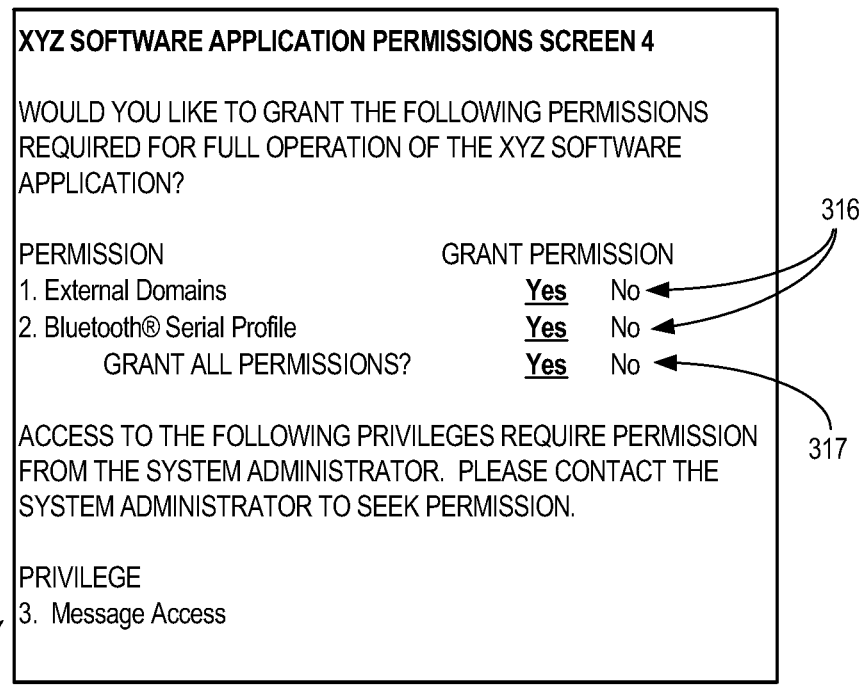

Should the user continue, application permissions module 148 may then proceed to display a screen 300D as shown in FIG. 3D. At this point, the application permissions module 148 can be configured to prompt the user with a listing of the required applications permissions and indicate for which applications permissions the user's grant is still required (e.g. as shown at 316).

In another embodiment, rather than listing all of the applications permissions required for the software application, only the applications permissions requiring the grant of a permission may be listed in screen 300D. For example, if the External Domains applications permission had already been granted, this applications permissions would not be listed in screen 300D.

In yet another embodiment, the applications permissions for which the user is authorized to grant permission may be separated from applications permissions that may have administrative restrictions on change.

In the illustrative embodiment shown in FIG. 3D, application permissions module 148 may ask the user the following: "WOULD YOU LIKE TO GRANT THE FOLLOWING PERMISSIONS REQUIRED FOR FULL OPERATION OF THE XYZ SOFTWARE APPLICATION?" In response, the user may grant permission, for example, by toggling back and forth between "Yes" and "No", for each permission listed. For example, the user could decide that access to External Domains and Bluetooth access should be allowed because the user wants to be able to use the application in a multi-user environment.

Alternatively, as shown at 317, the user may also be given an option to grant all required permissions using a single response. As will be appreciated, listing all of the required permissions into a list 316, and then providing the user with an opportunity to grant all required permissions with a response 317, may significantly reduce the number of user prompts necessary during the setup procedure.

In another embodiment, instead of "Yes" or "No" responses, the user may have the opportunity to increase or decrease access to the requested permissions using a discrete or continuous range (e.g. low, medium and high; a numeric setting between 1 and 10, etc.). Also, the user may seek more information on what each permission, if granted, will allow by providing a Help function.

Still referring to FIG. 3D, while a user may have authorization to grant certain permissions, some of the permissions sought may involve permissions which a system administrator may wish to strictly control for all mobile communication devices 100 within an enterprise. For example, as shown at 318, access to the messaging application 136 may be a permission which a system administrator may wish to control for each device 100, due to security or a privacy policy relating to messages. Thus, as shown at 319, for those application permissions requiring authorization from the system administrator, the application permissions module 148 may be configured to prompt the user to seek the required permission from the designated system administrator, prior to proceeding with the software application setup.

Upon receiving the set of new permissions granted by the user and the administrator, application permissions module 148 may be configured to review the list, and to modify or disable certain options, actions and other aspects of the software application to compensate should certain required permissions not be granted. This may be accompanied by a warning dialog or message to the user indicating that the software application may not fully function without all of the requested application permissions. For example, if the Message Access application permission is not granted by the administrator based on the user request, the user may not be able to invite someone from the address book to play a game application with the user.

In an alternative environment, if all of the requested permissions are not granted, the application permissions module 148 may be configured such that, at a later time, the request for application permissions (as illustrated in FIGS. 3A to 3D) may be repeated. This request for application permissions may either be periodic, or may be user initiated if for example the user is finding the reduced functionality of a software application to be too restrictive and wants to now grant all requested application permissions.

Figure 4:
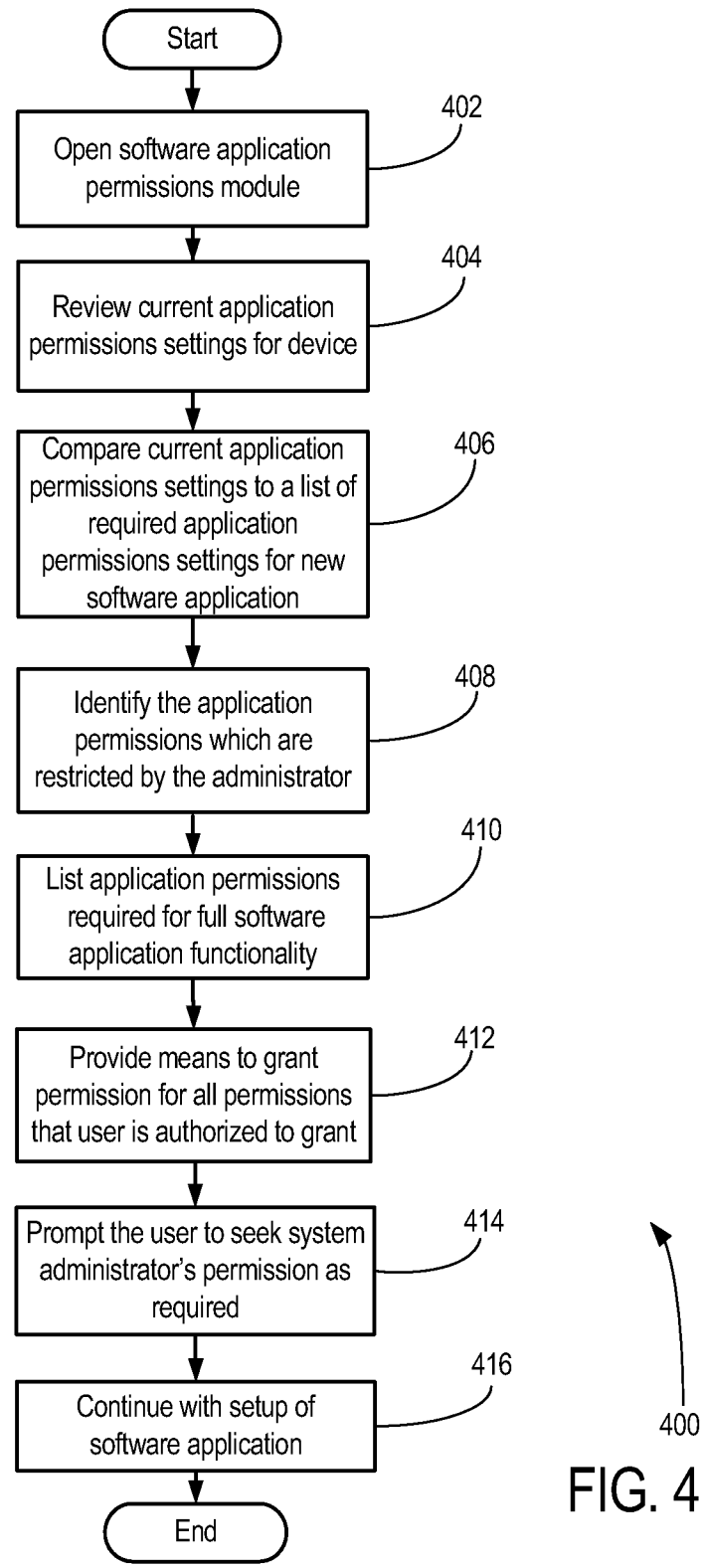
FIG. 4 shows a flowchart of a method in accordance with an embodiment.

Now referring to FIG. 4, shown is a flowchart of an illustrative method corresponding to the system described above. As shown, method 400 begins, and at block 402, and opens the software application permissions module 148. Next, at block 404, method 400 review the current application settings for device 100. Method 400 then proceeds to decision block 406, where method 400 compares the current application permissions settings to a list of required application permissions settings for a new software application. Method 400 then proceeds to block 408, where method 400 may identify the application permissions which are restricted by the system administrator, and which require permission from the system administrator to change. Method 400 then proceeds to block 410, where method 400 lists the application permissions required for full software application functionality.

At block 412, method 400 may provide means to seek user permission for all permissions that the user is authorized to grant (e.g. as illustrated above with reference to FIG. 3D). Method 400 then proceeds to block 414, where method 400 prompts the user to seek the system administrator's permission as may be required (e.g. Message Access). If there is no such privilege requiring the system administrator's permission, then this step 414 may be skipped.

Next, method 400 may proceed to block 416, where method 400 may continue with the software application setup process.

Thus, in an aspect of the invention, there is provided a method of setting application permissions for a software application on a device, comprising: reviewing the current application permissions settings on the device; comparing the current application permissions settings to a set of required application permissions settings for the software application; listing the set of required application permissions; and providing means to grant permission for all required application permissions the user is authorized to grant.

In an embodiment, the method further comprises listing only the required application permissions requiring a grant of permission.

In another embodiment, the method further comprises listing only the required application permissions which the user is authorized to grant.

In another embodiment, the method further comprises providing means to grant permission for all required permissions the user is authorized to grant in a single response.

In another embodiment, the method further comprises identifying applications permissions having administrative restrictions on changing the settings; and indicating in the listing of the set of applications permissions which have such administrative restrictions.

In another embodiment, the method further comprises prompting the user to seek the system administrator's permission if any required applications permissions have administrative restrictions.

In another aspect, there is provided a system for setting application permissions for a software application on a device, comprising: means for reviewing the current application permissions settings on the device; means for comparing the current application permissions settings to a set of required application permissions settings for the software application; means for listing the set of required application permissions; and means to grant permission for all required application permissions the user is authorized to grant.

In an embodiment, the system further comprises means for listing only the required application permissions requiring a grant of permission.

In another embodiment, the system further comprises means for listing only the required application permissions which the user is authorized to grant.

In another embodiment, the system further comprises means to grant permission for all required permissions the user is authorized to grant in a single response.

In another embodiment, the system further comprises means for identifying applications permissions having administrative restrictions on changing the settings; and means for indicating in the listing of the set of applications permissions which have such administrative restrictions.

In another embodiment, the system further comprises means for prompting the user to seek the system administrator's permission if any required applications permissions have administrative restrictions.

In another aspect, there is provided a computer readable medium storing computer code that when loaded into a device adapts the device to set applications permissions for a software application on the device, the computer readable medium comprising: code for reviewing the current application permissions settings on the device; code for comparing the current application permissions settings to a set of required application permissions settings for the software application; code for listing the set of required application permissions; and code for providing means to grant permission for all required application permissions the user is authorized to grant.

In an embodiment, the computer readable medium further comprises code for listing only the required application permissions requiring a grant of permission.

In an embodiment, the computer readable medium further comprises code for listing only the required application permissions which the user is authorized to grant.

In an embodiment, the computer readable medium further comprises code for providing means to grant permission for all required permissions the user is authorized to grant in a single response.

In an embodiment, the computer readable medium further comprises code for identifying applications permissions having administrative restrictions on changing the settings; and code for indicating in the listing of the set of applications permissions which have such administrative restrictions.

In an embodiment, the computer readable medium further comprises code for prompting the user to seek the system administrator's permission if any required applications permissions have administrative restrictions.

While illustrative embodiments have been described above, it will be appreciated that various changes and modifications may be made. More generally, the scope of the invention is defined by the following claims.

What is claimed is:

1. A method of setting application permissions for a software application on a device, the software application having a set of required application permissions, the device having current application permission settings, the method comprising:
   comparing, on the device, the current application permissions settings to the set of required application permissions for the software application to identify one or more required application permissions within the set that are not granted in the current application permissions setting;

wherein each of at least one of the identified required application permissions is subject to an administrative restriction that prevents device users from granting the required application permission;

displaying an interface screen for setting a listing of permissions displayed with their current settings;

wherein each of the identified required application permissions that is not granted in the current application permission settings and that is not subject to the administrative restriction is included for display in the listing;

wherein each of the identified required application permissions that is not granted in the current application permission settings and that is subject to the administrative restriction is excluded from the listing; and receiving, an input through the interface screen changing the current application permission settings.

2. The method of claim 1, wherein changing, the current application permission settings includes granting one or more of the required application permissions within the set that are not granted.

3. The method of claim 1, wherein changing the current application permission settings includes denying one or more of the required application permissions within the set that are granted.

4. The method of claim 1, wherein said listing includes only the one or more required application permissions within the set that are not granted.

5. The method of claim 1, further comprising displaying a prompt to seek a system administrator's permission regarding one or more of the required application permissions within the set that are not granted and that are subject to the administrative restriction.

6. The method of claim 1, further comprising receiving the input changing the current application permission settings to grant the one or more required application permissions within the set that are not granted in a single response.

7. The method of claim 6, wherein displaying includes displaying a prompt requesting the input.

8. A device, comprising:
a display;
a memory storing current application permission settings and a software application, the software application having a set of required application permissions;
a processor;
an application permissions module which, when executed by the processor, configures the processor to
compare the current application permissions settings to the set of required application permissions for the software application to identify one or more required application permissions within the set that are not granted in the current application permissions setting,
wherein each of at least one of the identified required application permissions is subject to an administrative restriction that prevents device users from granting the required application permission,
display on the display an interface screen for setting a listing of permissions displayed with their current settings,
wherein each of the identified required application permissions that is not granted in the current application permission settings and that is not subject to the administrative restriction is included for display in the listing,
wherein each of the identified required application permissions that is not granted in the current application permission settings and that is subject to the administrative restriction is excluded from the listing, and
receive, an input through the interface screen changing the current application permission settings.

9. The device of claim 8, wherein changing the current application permission settings includes granting one or more of the required application permissions within the set that are not granted.

10. The device of claim 8, wherein changing the current application permission settings includes denying one or more of the required application permissions within the set that are granted.

11. The device of claim 8, wherein said listing includes only the one or more required application permissions within the set that are not granted.

12. The device of claim 8, wherein the application permissions module configures the processor to display a prompt to seek a system administrator's permission regarding one or more of the required application permissions within the set that are not granted and that are subject to the administrative restriction.

13. The device of claim 8, wherein the application permissions module configures the processor to receive the input changing the current application permission settings to grant the one or more required application permissions within the set that are not granted in a single response.

14. The device of claim 13, wherein the application permissions module configures the processor to display a prompt requesting the input.

15. A non-transitory computer-readable medium storing computer-executable instructions, which when executed, configure a processor to set application permissions for a software application on a device, the software application having a set of required application permissions, the device having current application permission settings, the computer-executable instructions comprising:
instructions for comparing, on the device, the current application permissions settings to the set of required application permissions for the software application to identify one or more required application permissions within the set that are not granted in the current application permissions setting;
wherein each of at least one of the identified required application permissions, is subject to an administrative restriction that prevents device users from granting the required application permission;
instructions for displaying an interface screen for setting a listing of permissions displayed with their current settings;
wherein each of the identified required application permissions that is not granted in the current application permission settings and that is not subject to the administrative restriction is included for display in the listing;
wherein each of the identified required application permissions that is not granted in the current application permission settings and that is subject to the administrative restriction is excluded from the listing; and
instructions for receiving, an input through the interface screen changing the current application permission settings.

16. The computer-readable medium of claim 15, wherein instructions for receiving an input changing the current application permission settings include instructions for granting one or more of the required application permissions within the set that are not granted.

17. The computer-readable medium of claim 15, wherein instructions for receiving an input changing the current application permission settings include instructions for denying one or more of the required application permissions within the set that are granted.

18. The computer-readable medium of claim 15, wherein said listing includes only the one or more required application permissions within the set that are not granted.

19. The computer-readable medium of claim 15, further comprising instructions for displaying a prompt to seek a system administrators permission regarding one or more of the required application permissions within the set that are subject to the administrative restriction.

20. The computer-readable medium of claim 15, further comprising instructions for receiving the input changing the current application permission settings to grant the one or more required application permissions within the set that are not granted in a single response.

21. The computer-readable medium of claim 20, wherein instructions for displaying include instructions for displaying a prompt requesting the input.

\* \* \* \* \*